US004001632B2

United States Statutory Invention Registration [19]

[11] Reg. Number: H1632

[45] Published: Feb. 4, 1997

Brun et al.

[54] LIQUID LAUNDRY DETERGENT FORMULATIONS

[75] Inventors: Anne M. Brun, Houston; Kirk H. Raney, Sugarland, both of Tex.

[73] Assignee: Shell Oil Company, Houston, Tex.

[21] Appl. No.: 290,657

[22] Filed: Aug. 15, 1994

(Under 37 CFR 1.47)

[51] Int. Cl.[6] ..... C11D 1/12; C11D 1/24; C11D 1/83

[52] U.S. Cl. ..... 510/340; 510/342; 510/537; 510/424; 510/425; 510/434; 510/506

[58] Field of Search ..... 252/549, 551, 252/553, 556, 174.21, 173, 135, 535, 537, DIG. 14

[56] References Cited

U.S. PATENT DOCUMENTS

| | | | |
|---|---|---|---|
| 3,919,125 | 11/1975 | Ashina et al. | 252/551 |
| 3,928,249 | 12/1975 | Nunziata et al. | 252/526 |
| 3,951,826 | 4/1976 | Rasmussen | 252/8.9 |
| 4,075,118 | 2/1978 | Gault | 252/135 |
| 4,110,262 | 8/1978 | Arnau | 252/545 |
| 4,111,855 | 9/1978 | Barrat | 252/545 |
| 4,140,641 | 2/1979 | Ramachandran | 252/8.75 |
| 4,147,649 | 4/1979 | Arnau | 252/89 |
| 4,201,686 | 5/1980 | Augustijn | 252/174.22 |
| 4,316,812 | 2/1982 | Hancock et al. | 252/99 |
| 4,525,291 | 6/1985 | Smith et al. | 252/95 |
| 4,537,709 | 8/1985 | Edge et al. | 252/558 |
| 4,618,446 | 10/1986 | Haslop et al. | 252/135 |
| 4,659,497 | 4/1987 | Akred et al. | 252/135 |
| 4,671,894 | 6/1987 | Lamb et al. | 252/545 |
| 4,772,413 | 9/1988 | Massaux et al. | 252/102 |
| 4,777,038 | 10/1988 | Scheuffgen | 424/70 |

FOREIGN PATENT DOCUMENTS

| | | |
|---|---|---|
| 0125854 | 11/1984 | European Pat. Off. . |
| 0487169 | 5/1992 | European Pat. Off. . |
| 92/06171 | 4/1992 | WIPO . |

OTHER PUBLICATIONS

U.S. application Ser. No. 053,926, filed Apr. 26, 1993 (Attorney Docket No. TH–0081 (US)).

*Primary Examiner*—Charles T. Jordan
*Assistant Examiner*—J. R. Hardee

[57] ABSTRACT

The present invention provides a clear, flowable liquid laundry detergent formulation comprising one or more of certain alcohol ethoxylate compounds, one or more alcohol ethoxysulfate compounds, one or more alkylaryl sulfonate compounds, water and, optionally, one or more organic water-soluble builders.

21 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LIQUID LAUNDRY DETERGENT FORMULATIONS

FIELD OF THE INVENTION

The present invention relates to a clear, flowable liquid laundry detergent formulation which comprises one or more $C_{11}$ alcohol ethoxylate compounds, one or more alcohol ethoxysulfate compounds, one or more alkylaryl sulfonate compounds, water, and optionally, one or more organic water-soluble builders.

BACKGROUND OF THE INVENTION

The detergent industry is currently quite interested in concentrated detergent products. These products provide advantages to the consumer, who has a product which can be more easily used and in lower amounts. The products also provide advantages to the manufacturer and distributor, who have lower transportation and warehousing costs. Preparation of concentrated built laundry liquids containing high levels of surfactant and builder has been, however, difficult due to the limited solubility of surfactants and most builders in water.

It has been found that the use of $C_{11}$ alcohol ethoxylate compounds allows higher levels of both surfactant and builder to be incorporated into both built and unbuilt laundry liquids than is possible with laundry liquids containing alcohol ethoxylate compounds having different carbon numbers. It has further been found that the concentrations of both surfactant and builder can be increased without adversely affecting the clarity or the flowability of the laundry liquids.

SUMMARY OF THE INVENTION

The present invention provides a clear, flowable liquid laundry detergent formulation comprising one or more $C_{11}$ alcohol ethoxylate compounds, one or more alcohol ethoxysulfate compounds, one or more alkylaryl sulfonate compounds, water, and optionally, one or more organic water-soluble builders.

DESCRIPTION OF THE PREFERRED EMBODIMENTS

Figure 1:
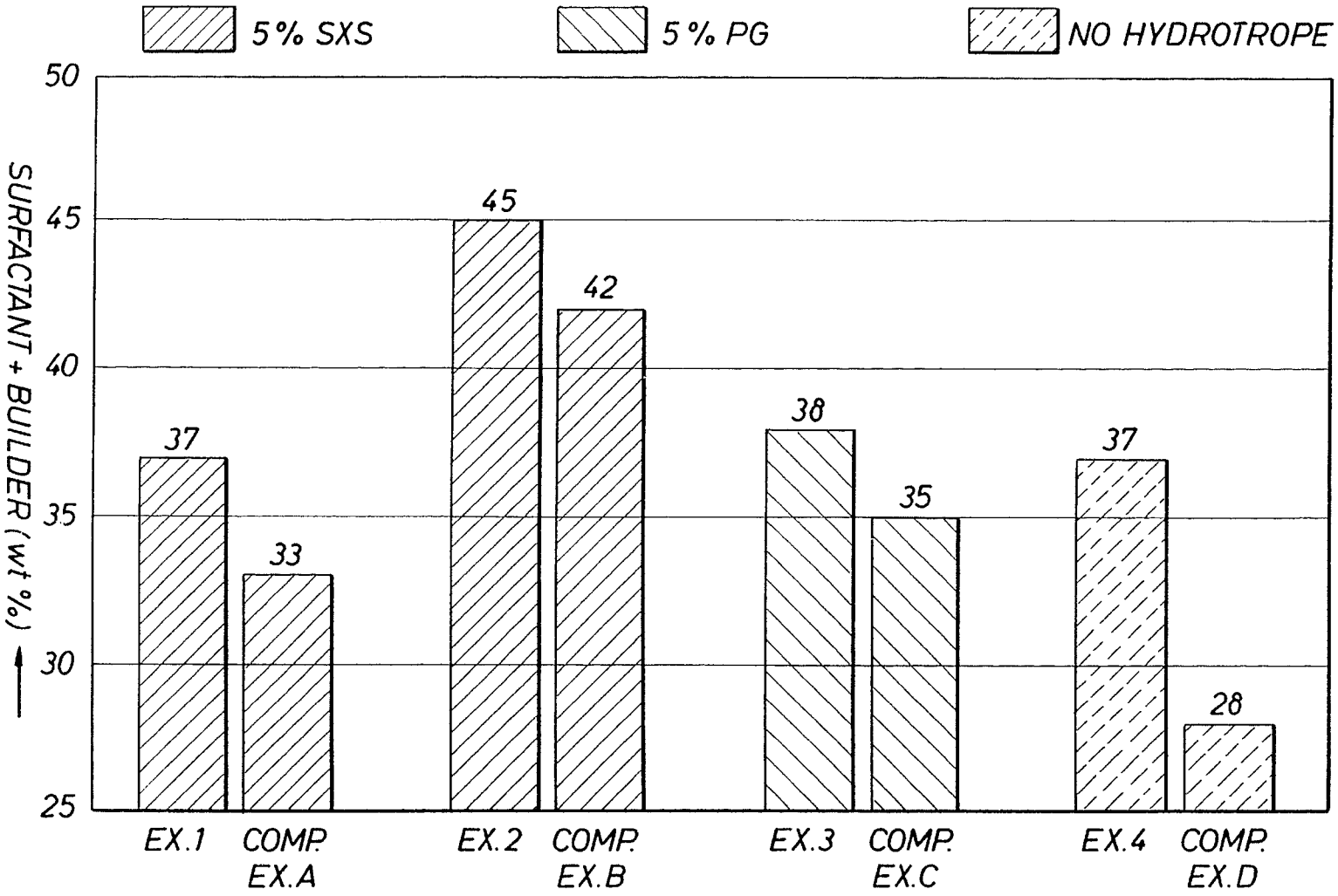
FIG. 1 represents the maximum concentrations of surfactants (alcohol ethoxylate, alcohol ethoxysulfate and linear alkylbenzenesulfonate) and builder, if present, which can be incorporated into a clear, flowable laundry liquid both in the presence and absence of a $C_{11}$ alcohol ethoxylate nonionic surfactant component.

The present invention provides clear, flowable liquid laundry detergent formulations comprising one or more $C_{11}$ alcohol ethoxylate compounds, one or more alcohol ethoxysulfate compounds, one or more alkylaryl sulfonate compounds, water, and optionally, one or more organic water-soluble builders. The laundry liquid formulations of the present invention typically contain from about 1 percent by weight to about 30 percent by weight of one or more $C_{11}$ alcohol ethoxylate compounds, from about 1 percent by weight to about 30 percent by weight of one or more alcohol ethoxysulfate compounds, from about 1 percent by weight to about 30 percent by weight of one or more alkylaryl sulfonate compounds, and from about 30 percent by weight to about 80 percent by weight of water. When the laundry liquid formulation is a built formulation, it typically contains from about 1 percent by weight (% wt.) to about 20 percent by weight of one or more organic water-soluble builders.

The $C_{11}$ alcohol ethoxylate component of the present invention is suitably the ethylene oxide adduct (polyethyleneglycol ether) of one or more $C_{11}$ primary or secondary alcohols. The $C_{11}$ alcohol ethoxylate may be represented by the formula $R—(OC_2H_4)_nO—H$ (I), wherein R is a $C_{11}$ alkyl group and n represents the average number of oxyethylene groups per molecule and is an integer in the range of from about 5 to about 12, preferably from about 7 to about 10. R is preferably a straight chain $C_{11}$ alkyl group.

The alcohol ethoxylate component of this invention can be conventionally prepared by the sequential addition of ethylene oxide to the corresponding $C_{11}$ alcohol in the presence of a strong base, such as an alkali metal or alkaline earth metal hydroxide, which serves as a catalyst for the ethoxylation reaction. The most common class of alcohol ethoxylates and the ones which are particularly useful in this invention are the primary alcohol ethoxylates, i.e., compounds of formula I in which R is a $C_{11}$ alkyl group and the $—(OC_2H_4)_nH$ ether substituent is bound to a primary carbon of the $C_{11}$ alkyl group.

The amount of $C_{11}$ alcohol ethoxylate compound or compounds present in the laundry liquid formulation of the present invention is typically in the range of from about 1 percent by weight to about 30 percent by weight, and preferably in the range of from about 5 percent by weight to about 20 percent by weight, basis the total weight of the formulation.

The laundry liquid formulation also contains one or more alcohol ethoxysulfate compounds, i.e., alkyl ethylene oxide ether sulfate compounds. The general class of alcohol ethoxysulfates suitable for use in the present invention may be represented by the formula $R'—O—(CH_2CH_2O)_x—SO_3M$ (II), wherein R' is a straight chain or branched chain alkyl group having in the range of from about 8 to about 18 carbon atoms, preferably from about 12 to about 18, or an alkylaryl group having an alkyl moiety having from about 8 to about 12 carbon atoms, x represents the average number of oxyethylene groups per molecule and is an integer in the range of from about 1 to about 12, and preferably from about 2 to about 7, and M is a cation selected from an alkali metal ion, an ammonium ion, and mixtures thereof. R' is preferably a straight chain alkyl group, that is, at least about 50 percent, preferably about 80 percent, of the alkyl R' groups in the formulation are straight chain. It is understood that R' can be substituted with any substituent which is inert such as, for example, halo groups.

The alcohol ethoxysulfate component is typically prepared by first reacting an alcohol having from about 8 to about 18 carbon atoms with about 1 to about 12 moles of ethylene oxide per mole of alcohol to form an alcohol ethoxylate product. Thereafter, the alcohol ethoxylate product is then sulfated with a suitable sulfating agent, and the resulting sulfated product is neutralized with an aqueous alkali metal solution.

Specific alcohol ethoxysulfates suitable for use in the laundry liquid formulations of the present invention include sulfated ethoxylated fatty alcohols, preferably linear or secondary alcohols having from about $C_8$ to about $C_{18}$, preferably from about $C_{12}$ to about $C_{15}$ alkyl groups, and an average of about 1 to about 12, preferably from about 2 to about 7, moles of ethylene oxide per mole of alcohol, and sulfated ethoxylated alkylphenols having from about $C_8$ to about $C_{18}$, preferably from about $C_{12}$ to about $C_{15}$ alkyl groups, and an average of about 1 to about 12 moles of ethylene oxide per mole of alkylphenol. The preferred class of alcohol ethoxysulfates for use in the laundry liquid formulation is sulfated linear alcohols such as those prepared by sulfating a $C_{12}$–$C_{15}$ alcohol ethoxylated with an average of from about 2 to about 7 moles of ethylene oxide.

The amount of alcohol ethoxysulfate compound or compounds present in the laundry liquid formulation of the present invention is typically in the range of from about 1 percent by weight to about 30 percent by weight, and preferably in the range of from about 5 percent by weight to about 20 percent by weight, basis the total weight of the formulation.

The laundry liquid formulation further contains one or more alkylaryl sulfonate compounds. Particularly suitable alkylaryl sulfonates are those in which the alkyl group contains from about 8 to about 16 carbon atoms. Compounds having a linear (straight chain) alkyl group are preferred. Alkylaryl sulfonate compounds are typically prepared by the alkylation of benzene with olefins (e.g., $C_8$ to $C_{16}$ olefins), followed by sulfonation (e.g., reaction with $SO_3$) to produce alkylbenzene sulfonic acids, and finally neutralization (e.g., with sodium hydroxide) to yield the (sodium) sulfonate salt. The salt is preferably an alkali metal, ammonium or amine salt, or a mixture of such salts. Alkali salts are particularly preferred, especially sodium salts.

Alkylaryl sulfonates which are especially suitable for use in the laundry liquid formulations of the present invention are linear alkylbenzene sulfonates in which the average number of carbons in the alkyl group is from about 11 to about 13, with linear alkylbenzene sulfonates having 11 carbon atoms in the alkyl group being particularly preferred.

The amount of alkylaryl sulfonate compound or compounds present in the laundry liquid formulation of the present invention is typically in the range of from about 1 percent by weight to about 30 percent by weight, and preferably in the range of from about 5 percent by weight to about 20 percent by weight, basis the total weight of the formulation.

In addition to the $C_{11}$ alcohol ethoxylate nonionic surfactant component and the alcohol ethoxysulfate and alkylaryl sulfonate anionic components, the laundry liquid formulation may contain one or more additional surfactants selected from the group consisting of nonionic surfactants, anionic surfactants, zwitterionic surfactants, cationic surfactants and mixtures thereof. The additional surfactant compounds would function as cleaning agents in the liquid laundry detergent formulations of the present invention.

In addition to the $C_{11}$ alcohol ethoxylate component, suitable nonionic surfactants for use as additional surfactants in the detergent formulation of the present invention are suitably made up of one or more ethylene oxide adducts (i.e., "ethoxylates") of alcohols or alkyl-substituted phenols, and can be represented by the formula $RO—(CH_2CH_2O)_n—H$, wherein the RO group corresponds to the starting alcohol or alkyl-substituted phenol (in each case less its active hydrogen atom). In general, the alcohol ethoxylates are preferably derived from alcohols, particularly alkanols, in the carbon number range from about 9 to 16, while preferred alkylphenol ethoxylates are derived from those having alkyl substituents in the carbon number range from about 8 to 12. Both the alcohol ethoxylates and the alkyl-phenol ethoxylates are nonionic surfactants well known as components of commercial liquid laundry detergent formulations.

With regard to the use of alcohol ethoxylates as additional surfactants, the individual compounds are more preferably characterized by an alkyl R group in the carbon number range from about 12 to 15. Both primary and secondary alcohol ethoxylates (having primary or secondary alkyl R groups, respectively) are suitable in the invention. The R group is suitably linear or branched.

The alkyl-substituted phenol ethoxylate compounds more preferably have an alkyl substituent with between about 8 and about 11 carbon atoms. The alkyl substituent may be either branched or linear.

Suitable alcohol ethoxylates for use as additional nonionic surfactants contain an average number of ethylene oxide units (i.e., an average value of n in the above formula) which is in the range from about 4 to 12 per molecule. Preferably, the additional ethoxylate surfactants contain an average number of ethylene oxide units which is in the range from about 5 to 10 per molecule, with between about 5 and 9 ethylene oxide units being particularly preferred for the alcohol ethoxylates and between about 6 and 10 ethylene oxide units being particularly preferred for the alkyl phenol ethoxylates.

Suitable anionic surfactants for use as additional surfactant compounds in the laundry liquid formulation of the present invention include the water-soluble, particularly the alkali metal, ammonium and alkylolammonium (e.g., monoethanolammonium, diethanolammonium or triethanolammonium) salts of organic sulfuric acid reaction products having in their molecular structure an alkyl group containing from about 10 to about 20 carbon atoms and a sulfonic or sulfuric acid ester group. As used herein, the term "alkyl" also includes the alkyl portion of aryl groups. Examples of anionic synthetic surfactants include primary alkyl sulfates and secondary alkyl sulfates, especially those obtained by sulfating the higher alcohols ($C_8$–$C_{18}$ carbon atoms) and/or detergent range olefins ($C_8$–$C_{18}$ carbon atoms). Especially suitable are secondary alkyl sulfates in which the average number of carbon atoms in the chain is in the range of from about 14 to about 18.

Other anionic surfactants suitable for use as additional surfactants in the laundry liquid formulation of the present invention include the water-soluble salts of: paraffin sulfonates containing from about 8 to about 24 carbon atoms; alkyl glyceryl ether sulfonates derived from ethers of $C_8$–$C_{18}$ alcohols; and alkyl phenol ethoxysulfates containing from about 1 to about 10 units of ethylene oxide per molecule and from about 8 to about 12 carbon atoms in the alkyl group. Also suitable as additional anionic surfactants are the water-soluble salts of esters of alpha-sulfonated fatty acids containing from about 6 to about 20 carbon atoms in the fatty acid group and from about 1 to about 10 carbon atoms in the ester group; water-soluble salts of 2-acyloxyalkane-1-sulfonic acids containing from about 2 to about 9 carbon atoms in the acyl group and from about 9 to about 23 carbon atoms in the alkane moiety; water-soluble salts of olefin sulfonates containing from about 12 to about 16 carbon atoms; and beta-alkyloxy alkane sulfonates containing from about 1 to about 3 carbon atoms in the alkyl group and from about 8 to about 20 carbon atoms in the alkane moiety.

Suitable zwitterionic surfactants for use as additional surfactant compounds in the laundry liquid formulation of the present invention include derivatives of aliphatic quaternary ammonium, phosphonium, and sulfonium compounds in which the aliphatic moiety can be straight chain or branched chain and wherein one of the aliphatic substituents contains from about 8 to about 24 carbon atoms and another substituent contains at least one anionic water-solubilizing group. Examples of suitable zwitterionic surfactants include 3(N,N-dimethyl-N-hexadecylammonio)-propane-1-sulfonate and the ammonium sulfonates and sulfates disclosed in U.S. Pat. Nos. 3,925,262, issued Dec. 9, 1975 and 3,929,678, issued Dec. 30, 1975, the teachings of which are incorporated herein by reference.

Suitable cationic surfactants for use as additional surfactant compounds in the laundry liquid formulation of the present invention include octadecyl trimethylammonium chloride, cetyl trimethylammonium methyl sulfate, polymeric cationics derived from monomers such as N,N,N-trimethyl-N-methylacryloxy (2-hydroxy propyl) ammonium chloride and cationic monomers such as those described in U.S. Pat. Nos. 4,212,820, issued on Jul. 15, 1980, 4,098,987, issued Jul. 4, 1978, 4,171,418 issued on Oct. 16, 1979, and 4,426,489, issued Jan. 7, 1984, the relevant teachings of which are incorporated herein by reference. In addition to quaternary ammonium cationic moieties, the compounds with phosphonium, sulfonium, pyridinium and isothiouronium moieties and the like are also among the well-known cationic surfactants.

When the laundry liquid formulation contains one or more additional surfactant compounds, the amount of such compound(s) typically present in the liquid laundry detergent formulation is in the range of from about 1 percent by weight to about 10 percent by weight, and preferably in the range of from about 1 percent by weight to about 5 percent by weight, basis the total weight of the formulation.

In addition to the $C_{11}$ alcohol ethoxylate, alcohol ethoxysulfate, alkylaryl sulfonate surfactant compounds, the only other necessary component of the laundry liquid formulation of the invention is water. In general, water is present in an amount in the range of from about 30 percent by weight to about 80 percent by weight, and preferably in the range of from about 40 to about 70 percent by weight, basis the total weight of the formulation.

The laundry liquid formulations of the present invention can be built laundry liquids or unbuilt laundry liquids. Built laundry liquids are desirable when good cleaning performance in hard water is desired. The formulation for a built laundry liquid can be the same as that for an unbuilt formulation except that, in addition to water and the $C_{11}$ alcohol ethoxylate, alcohol ethoxysulfate, alkylaryl sulfonate surfactant compounds, the built formulation will contain one or more organic water-soluble builders which, in general, provide enhanced cleaning performance by softening the water. The builder is a water-soluble organic compound and is preferably a water-soluble polycarboxylate builder. Suitable water-soluble organic builders include the water-soluble salts, especially the sodium, potassium, and alkylolammonium salts, of citric acid, nitrilo triacetic acid, ethylenediamine tetraacetic acid, carboxymethylsuccinic acid, tartaric acid monosuccinate, and tartaric acid disuccinate. The builder is preferably selected from the group consisting of sodium citrate, potassium citrate, monoethanolammonium citrate, diethanolammonium citrate, triethanolammonium citrate, sodium nitrilo triacetate, monoethanolammonium nitrilo triacetate, diethanolammonium nitrilotriacetate, triethanolammonium nitrilo triacetate, potassium nitrilo triacetate, sodium ethylenediamine tetraacetate, potassium ethylenediamine tetraacetate, monoethanolammonium ethylenediamine tetraacetate, diethanolammonium ethylenediamine tetraacetate, triethanolammonium ethylene diamine tetraacetate, the sodium salt of tartaric acid monosuccinate, the potassium salt of tartaric acid monosuccinate, the monoethanolammonium salt of tartaric acid monosuccinate, the diethanolammonium salt of tartaric acid monosuccinate, the triethanolammonium salt of tartaric acid monosuccinate, the sodium salt of tartaric acid disuccinate, the potassium salt of tartaric acid disuccinate, the monoethanolammonium salt of tartaric acid disuccinate, the diethanolammonium salt of tartaric acid disuccinate, the triethanolammonium salt of tartaric acid disuccinate, and mixtures thereof. In a particularly preferred embodiment, the water-soluble organic builder is sodium citrate. The builder is present in an amount of from about 1 percent by weight to about 20 percent by weight, preferably from about 5 percent by weight to about 15 percent by weight.

With respect to built laundry formulations of the present invention, the weight ratio of total surfactant ($C_{11}$ alcohol ethoxylate, alcohol ethoxylate and alkylaryl sulfonate surfactant compounds plus any additional surfactant compound(s)) to water-soluble organic builder will typically be in the range of from about 6:1 to about 2:1, and preferably in the range of from about 5:1 to about 3:1.

In addition to the organic water-soluble builders, built formulations may contain one or more hydrotropes and/or solubilizers to aid in the blending of the surfactant and builder components. Suitable hydrotropes include sodium xylenesulfonate, propylene glycol, sodium cumenesulfonate, hexylene glycol, sodium toluenesulfonate and the like, with sodium xylenesulfonate and propylene glycol being preferred. When one or more hydrotropes is included in the formulation, it generally represents less than about 10 percent by weight of the formulation.

The laundry liquid formulations of the present invention, both built and unbuilt, may include minor amounts of other components known in the art for use in such products such as, for example, fragrances, dyes, pH buffers, enzymes, suds regulants, anti-redeposition agents, antioxidants and the like. Such components, if present, typically comprise less than about 5 percent by weight of the formulation.

The laundry liquid formulation of the present invention may be prepared by conventional processing techniques. A typical procedure for preparing the formulations of the present invention would be to mix the surfactant components and hydrotrope(s), if present, at the desired level in water and then adding the organic water-soluble builder, if any, and any additional ingredients.

The ranges and limitations provided in the instant specification and claims are those which are believed to particularly point out and distinctly claim the present invention. It is, however, understood that other ranges and limitations which perform substantially the same function in substantially the same manner to obtain the same or substantially the same result are intended to be within the scope of the present invention as defined by the specification and claims.

The invention is further described with reference to the following examples, which are intended to illustrate certain aspects of the invention, without limiting its broader scope.

Illustrative Embodiments

In the following examples and comparative examples, the weight ratio of linear alkylbenzene sulfonate to alcohol ethoxysulfate to alcohol ethoxylate is maintained at 3:3:2.

EXAMPLE 1

250 grams of $C_{11}$ alcohol ethoxysulfuric acid having an average of five ethylene oxide units per molecule, 150 grams of $C_{11}$ alcohol ethoxylate (AE) having an average of 9 ethylene oxide units per molecule, 66 grams of triethanolamine, and 22.6 grams of water were mixed at 50° C. 32.0 grams of the above mixture were then mixed well by hand with 5.0 grams sodium hydroxide (50% in water), 15.0 grams of $C_{11}$ linear alkylbenzene sulfonic acid, and 5.0 g sodium xylene sulfonate. 3.13 grams of this mixture were added to 1.92 grams water to yield a concentrated system containing 52% wt. of total surfactant. 2.06 grams of 5% sodium xylene sulfonate in water were then added in small increments until a clear, flowable liquid was obtained which remained stable indefinitely at room temperature. The composition of the formulation prepared is presented in Table I.

Comparative Example A 15.0 grams of $C_{12-13}$ alcohol ethoxylate (AE) having an average of 6.5 ethylene oxide units per molecule, 17.8 grams of $C_{11}$ linear alkylbenzene sulfonic acid, and 5.9 grams of sodium hydroxide (50% in water) were mixed well by hand. To this mixture were then added 17.8 grams of $C_{11}$ alcohol ethoxysulfuric acid having an average of five ethylene oxide units per molecule, 4.9 grams of triethanolamine, and 6.0 grams sodium xylene sulfonate. 3.10 grams of this mixture were then added to 1.90 grams water to yield a concentrated system containing 52% wt. of total surfactant. 2.90 grams of 5% sodium xylene sulfonate in water were then added in small increments until a clear flowable liquid was obtained which remained stable indefinitely at room temperature. The composition of the formulation prepared is presented in Table I.

EXAMPLE 2

250 grams of $C_{11}$ alcohol ethoxysulfuric acid having an average of five ethylene oxide units per molecule, 150 grams of $C_{11}$ alcohol ethoxylate (AE) having an average of 9 ethylene oxide units per molecule, 66 grams of triethanolamine, and 22.6 grams of water were mixed at 50° C. 32.0 grams of the above mixture were then mixed well by hand with 5.0 grams sodium hydroxide (50% in water), 15.0 grams of $C_{11}$ linear alkylbenzene sulfonic acid, and 5.0 grams sodium xylene sulfonate. 3.13 grams of this mixture were added to 1.37 grams water and 0.57 grams sodium citrate dihydrate to yield a concentrated system containing 52% wt. of total surfactant. 1.79 grams of 5% sodium xylene sulfonate in water were then added in small increments until a clear, flowable liquid was obtained which remained stable indefinitely at room temperature. The composition of the formulation prepared is presented in Table I.

Comparative Example B 15.0 grams of $C_{12-13}$ alcohol ethoxylate (AE) having an average of 6.5 ethylene oxide units per molecule, 17.8 grams of $C_{11}$ linear alkylbenzene sulfonic acid, and 5.9 grams of sodium hydroxide (50% in water) were mixed well by hand. To this mixture were then added 17.8 grams of $C_{11}$ alcohol ethoxysulfuric acid having an average of five ethylene oxide units per molecule, 4.9 grams of triethanolamine, and 6.0 grams sodium xylene sulfonate. 3.10 grams of this mixture were then added to 1.33 grams water and 0.61 grams sodium citrate dihydrate to yield a concentrated system containing 52% wt. of total surfactant. 2.32 grams of 5% sodium xylene sulfonate in water were then added in small increments until a clear flowable liquid was obtained which remained stable indefinitely at room temperature. The composition of the formulation prepared is presented in Table I.

EXAMPLE 3

25.0 grams of $C_{11}$ alcohol ethoxylate having an average of 9 ethylene oxide units per molecule, 40.4 grams of $C_{11}$ linear alkylbenzene sulfonic acid, and 10.7 grams of sodium hydroxide (50% in water) were mixed well by hand. To 16.4 grams of this mixture were added 13.1 grams of $C_{12-15}$ is alcohol ethoxysulfate having an average of three ethylene oxide units per molecule (sodium salt, 70% active in water) and 0.6 grams of the above $C_{11}$ alcohol ethoxylate. 15.0 grams of this mixture were then mixed well by hand with 1.81 grams of water. 3.65 grams of this mixture were added to 0.91 grams sodium citrate dihydrate and 0.65 grams of 40% propylene glycol in water to yield a concentrated system containing 50% of total surfactant. 3.76 grams of 5% propylene glycol in water were then added in small increments until a clear flowable liquid was obtained which remained stable indefinitely at room temperature. The composition of the formulation prepared is presented in Table I.

Comparative Example C 11.29 grams of $C_{12}$–$C_{15}$ alcohol ethoxysulfate (AES) having an average of three ethylene oxide units per molecule (sodium salt, 70% active in water), and 0.28 grams of a $C_{12}$–$C_{13}$ alcohol ethoxylate (AE) having an average of 6.5 ethylene oxide units per molecule were mixed well by hand. 2.05 grams of water were removed from the mixture in an oven at 50° C. 14.18 grams of a mixture containing 55% wt. $C_{11}$, linear alkylbenzenesulfonate (sodium salt), 34% wt. $C_{12}$–$C_{13}$ alcohol ethoxylate having an average of 6.5 ethylene oxide units per molecule and 9% wt. water, 2.01 grams of propylene glycol and 0.70 grams of water were added and the blend was mixed well. 3.28 grams of this mixture were removed and added to 0.91 grams of sodium citrate dihydrate and 0.81 grams of water to yield a concentrated sample containing 52% wt. of total surfactant and 16% wt. sodium citrate and 5% wt. propylene glycol. 4.63 grams of 5% propylene glycol in water were then added in small increments until a clear, flowable liquid was obtained which remained stable indefinitely at room temperature. The composition of the formulation prepared is presented in Table I.

EXAMPLE 4

25.0 grams of $C_{11}$ alcohol ethoxylate having an average of 9 ethylene oxide units per molecule, 40.4 grams of $C_{11}$ linear alkylbenzene sulfonic acid, and 10.7 grams of sodium hydroxide (50% in water) were mixed well by hand. To 16.4 grams of this mixture were added 13.1 grams of $C_{12-15}$ alcohol ethoxysulfate having an average of three ethylene oxide units per molecule (sodium salt, 70% active in water) and 0.6 grams of the above $C_{11}$ alcohol ethoxylate. 15.0 grams of this mixture were then mixed well by hand with 1.81 grams of water. 3.65 grams of this mixture were added to 0.91 grams sodium citrate dihydrate and 0.65 grams of water to yield a concentrated system containing 50% of total surfactant. 4.09 grams of water were then added in small increments until a clear flowable liquid was obtained which remained stable indefinitely at room temperature. The composition of the formulation prepared is presented in Table I.

Comparative Example D 11.28 grams of $C_{12}$–$C_{15}$ alcohol ethoxysulfate having an average of three ethylene oxide units per molecule (sodium salt, 70% active in water) and 0.21 grams of $C_{12}$–$C_{13}$ alcohol ethoxylate having an average of 6.5 ethylene oxide units per molecule were mixed well by hand. 1.95 grams of water were removed from the mixture in an oven at 50° C. 14.18 grams of a mixture containing 55% wt. $C_{11}$ linear alkylbenzenesulfonate (sodium salt), 34% wt. $C_{12}$–$C_{13}$ alcohol ethoxylate having an average of 6.5 ethylene oxide units per molecule and 9% wt. water and 2.58 grams of water were added and the blend was mixed well. 3.28 grams of this mixture were removed and added to 0.91 grams of sodium citrate dihydrate and 0.81 grams of water to yield a concentrated sample containing 52% wt. of total surfactant and 16% wt. sodium citrate. 7.38 grams of water were then added in small increments until a clear, flowable liquid was obtained which remained stable indefinitely at room temperature. The composition of the formulation prepared is presented in Table I.

Discussion of the Results and Detailed Description of the Drawings

As can be seen in FIG. 1 and Table I, the presence of $C_{11}$ alcohol ethoxylate in the liquid laundry detergent formulations allows significantly higher concentrations of total surfactant (AE, AES and LAS) and if present, builder (sodium citrate), to be incorporated into a clear, flowable formulation while maintaining a 3:3:2 LAS:AES:AE surfactant weight ratio. It can also be seen that the higher concentrations attributable to the presence of $C_{11}$ alcohol ethoxylate can be seen both in the absence and presence of conventional hydrotropes (propylene glycol and sodium xylene sulfonate).

TABLE I

| | LAUNDRY LIQUID FORMULATIONS | | | | | | | | |
|---|---|---|---|---|---|---|---|---|---|
| | RELATIVE PROPORTIONS OF SURFACTANTS[a)] | | | | % Wt. | % Wt. | % Wt.[c)] | % Wt. | % Wt. Total |
| | $C_{11}$AE[b)] | AE[b)] | AES[c)] | LAS[c)] | Hydrotrope[e)] | Water | Builder | Surfactant | Surfactant + Builder |
| Example 1 | 2 | — | 3 | 3 | 5 (SXS)[f)] | 58 | — | 37 | 37 |
| Comp. Ex. A | — | 2 | 3 | 3 | 5 (SXS) | 62 | — | 33 | 33 |
| Example 2 | 2 | — | 3 | 3 | 5 (SXS) | 50 | 7.3 | 38 | 45 |
| Comp. Ex. B | — | 2 | 3 | 3 | 5 (SXS) | 53 | 7.3 | 35 | 42 |
| Example 3 | 2 | — | 3 | 3 | 5 (PG)[g)] | 57 | 8.9 | 29 | 38 |
| Comp. Ex. C | — | 2 | 3 | 3 | 5 (PG) | 59 | 8.3 | 27 | 35 |
| Example 4 | 2 | — | 3 | 3 | — | 63 | 8.6 | 28 | 37 |
| Comp. Ex. D | — | 2 | 3 | 3 | — | 72 | 6.5 | 21 | 28 |

[a)]The weight ratio of anionic surfactant (AES + LAS):nonionic surfactant (AE) is 3:1 for all examples.
[b)]Alcohol ethoxylate.
[c)]Alcohol ethoxysulfate.
[d)]Linear alkylbenzenesulfonate.
[e)]Sodium citrate.
[f)]Sodium xylene sulfonate.
[g)]Propylene glycol.

What is claimed is:

1. A clear, flowable built liquid laundry detergent formulation which comprises one or more $C_{11}$ alcohol ethoxylate compounds, one or more alcohol ethoxysulfate compounds, one or more alkylaryl sulfonate compounds, and water.

2. The formulation of claim 1 wherein said $C_{11}$ alcohol ethoxylate has a formula $R—(OC_2H_4)_nO—H$ (I), wherein R is a $C_{11}$ alkyl group and n represents the average number of oxyethylene groups per molecule and is an integer in the range of from about 5 to about 12.

3. The formulation of claim 1 wherein said alcohol ethoxysulfate has a formula $R'—O—(CH_2CH_2O)_x—SO_3M$ (II), wherein R' is a straight chain or branched chain alkyl group having in the range of from about 8 to about 18 carbon atoms, or an alkylaryl group having an alkyl moiety having from about 8 to about 12 carbon atoms, x represents the average number of oxyethylene groups per molecule and is an integer in the range of from about 1 to about 12, and M is a cation selected from an alkali metal ion, an ammonium ion, and mixtures thereof.

4. The formulation of claim 1 wherein said alkylaryl sulfonate compound is a linear alkylbenzene sulfonate having an alkyl moiety having from about 8 to about 18 carbon atoms.

5. The formulation of claim 1 wherein said formulation additionally contains one or more surfactant compounds selected from the group consisting of anionic surfactants, nonionic surfactants, zwitterionic surfactants, cationic surfactants, and mixtures thereof.

6. The formulation of claim 5 wherein said one or more additional surfactant compounds is selected from the group consisting of anionic surfactants, nonionic surfactants, and mixtures thereof.

7. The formulation of claim 1 wherein said formulation additionally contains one or more organic water-soluble builders.

8. The formulation of claim 7 wherein said one or more organic water-soluble builders is selected from the group consisting of the sodium, potassium or alkylolammonium salts of citric acid, nitrilo triacetic acid, ethylenediamine tetraacetic acid, carboxymethylsuccinic acid, tartaric acid monosuccinate, tartaric acid disuccinate, and mixtures thereof.

9. The formulation of claim 8 wherein said organic water-soluble builder is sodium citrate.

10. The formulation of claim 7 wherein said formulation additionally contains one or more hydrotropes.

11. The formulation of claim 10 wherein said one or more hydrotropes is selected from the group consisting of sodium xylenesulfonate, propylene glycol, sodium cumenesulfonate, hexylene glycol, sodium toluenesulfonate, and mixtures thereof.

12. A clear, flowable built liquid laundry detergent formulation which comprises from about 1 percent by weight to about 30 percent by weight of one or more $C_{11}$ alcohol ethoxylate compounds, from about 1 percent by weight to about 30 percent by weight of one or more alcohol ethoxysulfate compounds, from about 1 to about 30 percent of one or more alkylaryl sulfonate compounds, and from about 30 percent by weight to about 80 percent by weight of water.

13. The formulation of claim 12 wherein said $C_{11}$ alcohol ethoxylate has a formula $R—(OC_2H_4)_nO—H$ (I), wherein R is a $C_{11}$ alkyl group and n represents the average number of oxyethylene groups per molecule and is an integer in the range of from about 5 to about 12.

14. The formulation of claim 12 wherein said alcohol ethoxysulfate has a formula $R'—O—(CH_2CH_2O)_x—SO_3M$ (II), wherein R' is a straight chain or branched chain alkyl group having in the range of from about 8 to about 18 carbon atoms, or an alkylaryl group having an alkyl moiety having from about 8 to about 12 carbon atoms, x represents the average number of oxyethylene groups per molecule and is an integer in the range of from about 1 to about 12, and M is a cation selected from an alkali metal ion, an ammonium ion, and mixtures thereof.

15. The formulation of claim 12 wherein said alkylaryl sulfonate compound is a linear alkylbenzene sulfonate having an alkyl moiety having from about 8 to about 18 carbon atoms.

16. The formulation of claim 12 wherein said formulation additionally contains one or more surfactant compounds selected from the group consisting of anionic surfactants, nonionic surfactants, zwitterionic surfactants, cationic surfactants, and mixtures thereof.

17. A clear, flowable built liquid laundry detergent formulation which comprises from about 1 percent by weight to about 30 percent by weight of one or more $C_{11}$ alcohol ethoxylate compounds, from about 1 percent by weight to about 30 percent by weight of one or more alcohol ethoxysulfate compounds, from about 1 to about 30 percent of one or more alkylaryl sulfonate compounds, from about 1 percent by weight to about 20 percent by weight of one or more organic water-soluble builders, and from about 30 percent by weight to about 80 percent by weight of water.

18. The formulation of claim 17 wherein said one or more organic water-soluble builders is selected from the group consisting of the sodium, potassium or alkylolammonium salts of citric acid, nitrilo triacetic acid, ethylenediamine acetic acid, carboxymethylsuccinic acid, tartaric acid monosuccinate, tartaric acid disuccinate, and mixtures thereof.

19. The formulation of claim 18 wherein said organic water-soluble builder is sodium citrate.

20. The formulation of claim 18 wherein said formulation additionally contains one or more hydrotropes.

21. The formulation of claim 20 wherein said one or more hydrotropes is selected from the group consisting of sodium xylenesulfonate, propylene glycol, sodium cumenesulfonate, hexylene glycol, sodium toluenesulfonate, and mixtures thereof.

* * * * *